Oct. 8, 1940.  C. K. HUTHSING  2,217,117
CONTINUOUS PRESSURE SEALING DEVICE
Filed Oct. 13, 1937
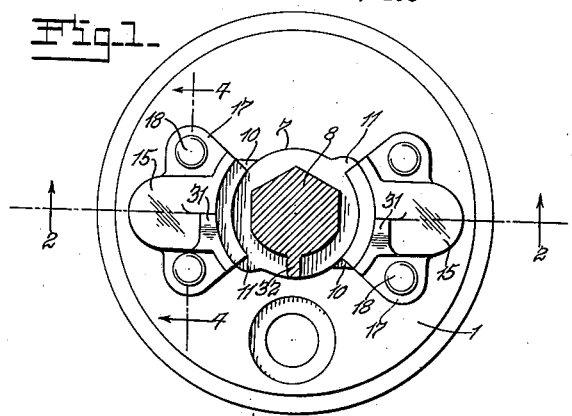
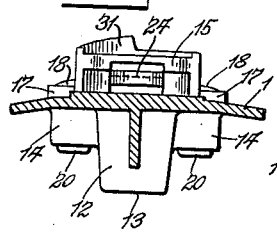
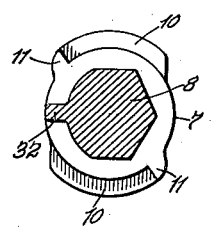
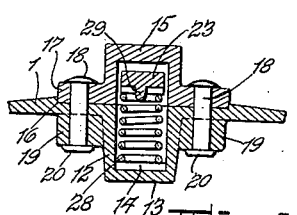
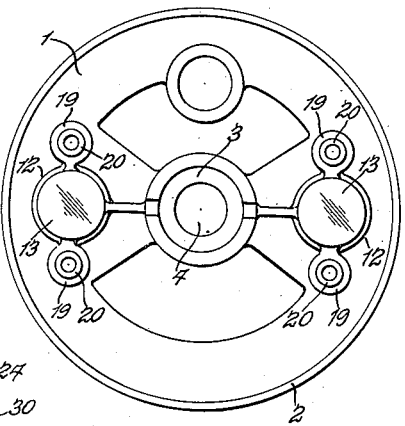
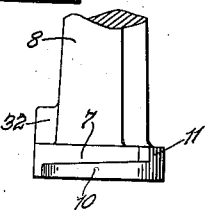
Inventor
Charles K. Huthsing
by Rippey & Cassidy
His Attorneys Patented Oct. 8, 1940

2,217,117

UNITED STATES PATENT OFFICE 2,217,117

CONTINUOUS PRESSURE SEALING DEVICE

Charles K. Huthsing, Detroit, Mich.

Application October 13, 1937, Serial No. 168,703

5 Claims. (Cl. 220—40)

This invention relates to continuous pressure sealing devices.

An object of the invention is to provide a sealing device for forming and maintaining an hermetic and leak-proof seal by the application of continuous pressure against one of the members forming the seal, so that a tight leak-proof joint will be maintained continuously irrespective of slight changes in the dimensions of the sealing gasket or sealing member caused by relative movement of the parts in opening and closing the seal, or resulting from the passage of time, or from other causes.

Another object of the invention is to provide an improved continuous pressure sealing device comprising presser levers for pressing one of the members toward the other, springs exerting a continuous pressure against said levers to cause them to function as stated, and structure for holding the parts in assembled relationship.

Another object of the invention is to provide an improved continuous pressure sealing device capable of various embodiments and wide variation in structure within the scope of the invention, whereby the device may be applied to different uses and to uses in different embodiments and environments.

Other objects and advantages of the invention will be readily apparent from the following description, reference being made to the annexed drawing, in which—

Fig. 1 is a plan view of the invention, the stem of the operating handle for one of the members being in section.

Fig. 2 is a cross-sectional view approximately on the line 2—2, Fig. 1.

Fig. 3 is a plan view showing the inner side of the sealing device.

Fig. 4 is a sectional view approximately on the line 4—4 of Fig. 1.

Fig. 5 is a plan view showing the construction and formation of the handle member of the sealing device.

Fig. 6 is a side elevation of said member.

Fig. 7 is a sectional view approximately on the line 7—7 of Fig. 2, one of the members of the sealing device being omitted.

Fig. 8 is an enlarged side elevation of one of the presser levers.

This improved continuous pressure sealing device is capable of use on fire extinguisher containers and on containers designed for application to many uses. In the specific embodiment chosen for illustration, the sealing device is contained in a lid or a closure for an opening into the container for which the device is intended.

The lid or closure comprises a wall 1 having an annular flange 2 integral with its periphery for engagement with the container to which the device is to be applied; an inwardly extended central boss 3 having an opening 4 therethrough and an outwardly extended annular flange 5 around the opening 4. The wall 1 is hereinafter sometimes called a supporting wall.

The sealing member or gasket 6 utilized to form and maintain an hermetic and leak-proof joint is confined in the space enclosed by a wall 7 integral with the inner end of the stem 8 which has a manipulative handle 9 in connection with its outer end. Two segmented or arcuate diametrically opposite outwardly extended flanges or cams 10 are formed integral with the inner end of the wall 7, and the outer walls of said flanges or cams 10 slope or incline slightly from their spaced free ends to their spaced opposite ends from which rise abutment shoulders 11.

The lid or supporting wall 1 is formed integral with a pair of inwardly extended pockets or wells 12 having their inner ends closed by walls 13 and their outer ends open. Each wall 13 has an integral transverse rib or flange 14 to support the presser springs so that they will function as desired.

A hollow holder member 15 is seated within a depression 16 in the wall 1 at the outer end of each pocket or well 12. The walls of the depression 16 assist in holding the associated holder member in rigid assembly with the closure member 1 and cooperate directly with the fasteners. The holder or pivot members 15 have laterally extended bases 17. Rivets 18 extend through holes in the bases 17 and through hollow bosses 19 projecting from the inner side of the wall 1 and have their inner ends 20 upset against the inner ends of said bosses, thereby holding the holder members 15 rigid on said wall 1.

The holder members 15 open toward the flange 5. The inner side of the inner margin of each member 15 is formed with a pivot rib 21 which seats in a notch 22 formed in a lever comprising a portion 23 and an end 24 extending angularly therefrom and toward the flange 5. A shoulder 25 cooperates with the end 24 to form an arcuate groove 26 that will receive the flanges or cams 10 when the seal is assembled. A rib 27 on each lever portion 23 seats against the outer end of a coil spring 28 mounted in the well or pocket 12 and having its inner end seated upon the rib 14. An ear 29 on the lever member 23 engages within the spring 28 and thereby holds the lever in assembly when the cooperating sealing member is removed.

The parts are brought into assembled relationship by passing the part 7 between the inner ends of the members 15 and then turning the member 8—9 until the cams or flanges 10 pass under the inner ends 24 of the presser levers. One edge of each lever end 24 is provided with a rounded or beveled formation 30 to permit the flanges or cams 10 to be turned under said lever ends. The levers are thereby moved slightly in opposition to the springs 28. Thus, the power of said springs 28 is continuously utilized to cause the presser levers to function to maintain the sealing device in a leakproof condition.

Turning movement of the member 8 to effect the seal is stopped when the parts are properly positioned by the abutment shoulders 11 coming into contact with the edges of the holder members 15 in the relationship shown in Fig. 1.

The holder members 15 are formed with upwardly extended lugs 31 for engagement with a supporting bracket element (not shown) when the invention is used in connection with a fire extinguisher container; and the member 8 is formed with an abutment projection 32 for engagement with a supporting bracket (not shown). Types of fire extinguisher containers in connection with which this device may obviously be used are disclosed in my prior Patents No. 2,088,790 and No. 2,088,791, both of which were issued August 3, 1937, and the device may obviously be held in connection with such containers, or containers of other types, by the fasteners disclosed in my said patents.

The turning movement of the member 8—9 and the sealing member or gasket 6 with respect to the closure 1 conditions the elements forming the seal so that a better and tighter joint is formed than could be formed if the sealing elements were not turned relatively, but were only moved normal to each other. Inequalities and unevenness in the parts, and particularly inequalities and unevenness in the sealing member or gasket 6, are substantially overcome or removed by the turning movement thereof against the closure 1 and the simultaneous application of pressure by the presser levers actuated by the springs 28. Thus, notwithstanding slight changes in the dimensions and molecular structure of the sealing member or gasket 6 resulting from opening and closing the seal or from the lapse of time or other causes, a tight seal will be formed when the seal is closed in the manner described and will be maintained by the continuous pressure applied by the presser levers actuated by the springs 28. When the seal is opened by removing the handle 8 and connected parts, contents of the container may be removed through the opening 4, or the container may be refilled through said opening 4, as is obvious.

While two presser levers are illustrated and, in many instances, are enough to attain the desired effects, it is apparent that the number of presser levers and actuating springs therefor may be varied in accordance with requirements. Further, the structural formation and arrangement of the parts may be widely varied without departure from the nature and principle of the invention.

I claim:

1. In a device of the character described including a supporting wall having an opening therethrough, a sealing member on said wall surrounding said opening, and an element cooperating with said sealing member to form a leakproof joint between said wall and said element; walls integral with said supporting wall forming pockets opening at the side of said supporting wall on which said element is located, springs mounted in said pockets, pivot members covering said pockets and opening toward said element, and levers engaging said pivot members between said last named walls and said element and having their inner ends engaging and holding said element in sealing cooperation with said sealing member and having their outer ends covered by said members and engaged with and actuated outwardly by said springs.

2. In a device of the character described including a supporting wall having an opening therethrough, a sealing member on said wall surrounding said opening, and an element cooperating with said sealing member to form a leak-proof joint between said wall and said element; walls integral with said supporting wall forming outwardly open pockets, springs located in said pockets, levers having their inner ends engaging said element and their outer ends engaged and actuated by said springs in a direction to clamp said element against said sealing member and thereby clamp said sealing member against said supporting wall, holders covering the outer ends of said pockets and also covering and concealing said levers, and pivots for said levers rigid with said holders between said pockets and said element.

3. In a device of the character described including a supporting wall having an opening therethrough, an element for closing said opening, and a sealing member between said wall and said element for forming a leak-proof joint; levers for holding said element in clamping engagement with said sealing member to form said leak-proof joint and having their inner ends engaging said element, springs supported by said wall for operating said levers in a direction to clamp said element against said sealing member, and walls covering and concealing said levers and said springs and having pivotal engagement with said levers between said springs and said element.

4. In a device of the character described including a supporting wall having an opening therethrough, an element for closing said opening, and a sealing member between said wall and said element for forming a leak-proof joint; levers engaging and holding said element in a position to clamp said sealing member against said wall to form said leak-proof joint, springs engaging the outer ends of and actuating said levers into engagement with said element, a handle for moving said element out of engagement with said levers, and wall means covering and concealing said springs and said levers and pivotally engaging said levers between said springs and said element.

5. In a device of the character described, a supporting wall having an opening therethrough and having depressions in its outer side spaced laterally from said opening, a removable and replaceable element for closing said opening, walls integral with said supporting wall forming outwardly open pockets adjacent to said depressions, springs located in said pockets, levers having their outer ends engaging said springs and their inner ends thereby pressed into engagement with said element and leaving said element free for rotation about its axis and having their outer ends adjacent to the open ends of said pockets, holders rigidly attached to said supporting wall within said depressions covering the outer ends of said pockets and also covering and concealing said levers, and pivots for said levers rigid with said holders inwardly beyond said pockets.

CHARLES K. HUTHSING.